(12) United States Patent
Yasui et al.

(10) Patent No.: US 8,877,856 B2
(45) Date of Patent: Nov. 4, 2014

(54) ADHESIVE RESIN COMPOSITION AND HOT MELT ADHESIVE OBTAINED THEREFROM

(75) Inventors: Hiroto Yasui, Ichihara (JP); Koji Matsunaga, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 13/979,536

(22) PCT Filed: Jan. 17, 2012

(86) PCT No.: PCT/JP2012/050822
§ 371 (c)(1),
(2), (4) Date: Jul. 12, 2013

(87) PCT Pub. No.: WO2012/099107
PCT Pub. Date: Jul. 26, 2012

(65) Prior Publication Data
US 2013/0296476 A1 Nov. 7, 2013

(30) Foreign Application Priority Data
Jan. 18, 2011 (JP) ................... 2011-007969

(51) Int. Cl.
*C09J 131/04* (2006.01)
*C09J 123/14* (2006.01)
*C09J 123/08* (2006.01)

(52) U.S. Cl.
CPC .............. *C09J 131/04* (2013.01); *C09J 123/14* (2013.01); *C09J 123/0853* (2013.01)
USPC ............................. 524/524; 525/222; 525/240

(58) Field of Classification Search
CPC ...... C09J 123/10; C09J 123/12; C09J 123/14; C09J 123/0853; C09J 131/04
USPC .................................... 524/524; 525/222, 240
See application file for complete search history.

(56) References Cited

U.S. PATENT DOCUMENTS

| 5,504,172 A | 4/1996 | Imuta et al. |
| 5,739,366 A | 4/1998 | Imuta et al. |

(Continued)

FOREIGN PATENT DOCUMENTS

| JP | 58-047038 A | 3/1983 |
| JP | 03-163088 A | 7/1991 |

(Continued)

OTHER PUBLICATIONS

International Search Report for International Application No. PCT/JP2012/050822.

(Continued)

*Primary Examiner* — Vu A Nguyen
(74) *Attorney, Agent, or Firm* — Foley & Lardner LLP (57) ABSTRACT

Provided is an adhesive resin composition having improved heat resistance without deteriorations in adhesive strength and flexibility. The adhesive resin composition comprises 30 to 98 wt % of an ethylene/vinyl acetate copolymer (a) and 70 to 2 wt % of a propylene resin composition (P), wherein the total of the component (a) and the component (P) is 100 wt %. The propylene resin composition (P) comprises 60 to 0 wt % of a propylene polymer (b) having a melting point of 120 to 170° C. and a melt flow rate of 0.1 to 500 g/10 min, and 40 to 100 wt % of a propylene polymer (c) having a melting point of less than 120° C. or showing no melting points and having a melt flow rate of 0.1 to 500 g/10 min, wherein the total of the component (b) and the component (c) is 100 wt %.

19 Claims, 3 Drawing Sheets

(56) References Cited

U.S. PATENT DOCUMENTS

| | | | |
|---|---|---|---|
| 5,767,033 A | 6/1998 | Imuta et al. | |
| 5,853,439 A | 12/1998 | Gieseke et al. | |
| 5,959,046 A | 9/1999 | Imuta et al. | |
| 6,171,355 B1 | 1/2001 | Gieseke et al. | |
| 6,627,723 B2 | 9/2003 | Karandinos et al. | |
| 6,747,114 B2 | 6/2004 | Karandinos et al. | |
| 7,488,789 B2 | 2/2009 | Ikenaga et al. | |
| 2008/0085977 A1 | 4/2008 | Okamoto et al. | |
| 2010/0173168 A1* | 7/2010 | Yasui et al. | 428/516 |
| 2010/0255302 A1* | 10/2010 | Aoyama et al. | 428/355 EN |
| 2010/0317802 A1* | 12/2010 | Aoyama et al. | 525/190 |

FOREIGN PATENT DOCUMENTS

| | | |
|---|---|---|
| JP | 07-145212 A | 6/1995 |
| JP | 08-003527 A | 1/1996 |
| JP | 08-134428 A | 5/1996 |
| JP | 08-325539 A | 12/1996 |
| JP | 10-130607 A | 5/1998 |
| JP | 11-035911 A | 2/1999 |
| JP | 2000-095916 A | 4/2000 |
| JP | 2001-511866 A | 8/2001 |
| JP | 2002-283341 A | 10/2002 |
| JP | 2003-518171 A | 6/2003 |
| JP | 2003-183611 A | 7/2003 |
| JP | 2005-272744 A | 10/2005 |
| JP | 2007-186664 A | 7/2007 |
| WO | WO-2004/087775 A1 | 10/2004 |

OTHER PUBLICATIONS

Japanese Office Action dated Sep. 9, 2014 issued in Application No. 2012-553729.

* cited by examiner

ADHEREND (PP)
ADHESIVE LAYER
ADHEREND (PP)

ADHESIVE RESIN COMPOSITION AND HOT MELT ADHESIVE OBTAINED THEREFROM

TECHNICAL FIELD

The present invention relates to adhesive resin compositions exhibiting excellent flexibility and heat resistance, and to hot melt adhesives obtained from the compositions.

BACKGROUND ART

Hot melt adhesives are generally based on thermoplastic resins. In accordance with the kinds of thermoplastic resins, hot melt adhesives are largely classified into polyolefin-based, elastomer-based, polyester-based and polyamide-based adhesives. These hot melt adhesives are solid materials that are not evaporated at normal temperature, and are thermally melted to exhibit fluidity when used, thereby allowing various adherends to be bonded instantly. Hot melt adhesives have been utilized in various fields due to many advantages such as pollution-free (no VOC emissions), low risk of fire, high productivity and a wide choice of adherends.

Ethylene/vinyl acetate copolymer (hereinafter, sometimes abbreviated to EVA) is a typical polymer used in polyolefin-based hot melt adhesives. Hot melt adhesives containing such a copolymer as well as a tackifier and a wax have found a wide use in products such as packages because they are inexpensive and are applicable to a wide range of applications by controlling the vinyl acetate content and the molecular weight of EVA which is the main component. However, EVA-based hot melt adhesives have some performance problems, in detail, lack of heat-resistant adhesiveness. This fact impedes broadening of the use of these adhesives to such industrial fields as automobiles and building materials. In detail, these adhesives are unsatisfactory in terms of creep characteristic during prolonged use in a high temperature environment (hereinafter, this characteristic is sometimes abbreviated as "thermal creep resistance") as well as adhesive strength at high temperatures (hereinafter, this characteristic is sometimes abbreviated as "high-temperature bonding properties").

Various approaches have been disclosed in order to improve thermal creep resistance and high-temperature bonding properties. For example, the content of a component such as vinyl acetate in EVA is optimized, or an aromatic hydrocarbon resin having a specific composition and a specific molecular weight is added to EVA (Patent Literatures 1 and 2). Alternatively, a maleated polyolefin is added to a composition based on EVA (Patent Literature 3). Still alternatively, an amorphous propylene/ethylene copolymer or propylene/butene copolymer is added to an EVA-based composition satisfying specific properties (Patent Literatures 4 and 5). However, these approaches cannot increase the heat resistance of adhesives sufficiently. It has been also found that increasing heat resistance by, for example, the addition of a crystalline component in turn results in a decrease in flexibility with the deterioration of adhesion due to stress concentration. Another approach for increasing heat resistance is to add a high-molecular weight component. In this case, however, it has been found that melt viscosity is so increased that workability, in particular applicability, is deteriorated.

CITATION LIST

Patent Literature

Patent Literature 1: JP-A-2003-183611
Patent Literature 2: JP-A-2005-272744
Patent Literature 3: JP-A-2001-511866
Patent Literature 4: JP-A-H08-325539
Patent Literature 5: JP-A-H08-3527

SUMMARY OF INVENTION

Technical Problem

The present invention has been made under the above-described circumstances. It is therefore an object of the invention to provide adhesive resin compositions improved in heat resistance, in particular high-temperature bonding properties and thermal creep resistance, without deteriorations in adhesive strength and flexibility, as well as to provide hot melt adhesives obtained from the compositions.

Solution to Problem

The present inventors carried out extensive studies in order to achieve the above object. As a result, the present inventors have found that the object is achieved by using as a hot melt adhesive a resin composition which comprises an ethylene/vinyl acetate copolymer, a propylene resin composition with specific properties, and optionally an amorphous poly-α-olefin, a functionalized propylene polymer, a tackifier and a fluidity modifier. The present invention has been accomplished based on the finding. That is, the present invention has the following essential configurations.

[1] An adhesive resin composition (A) comprising:
30 to 98 wt % of an ethylene/vinyl acetate copolymer (a), and
70 to 2 wt % of a propylene resin composition (P) (wherein the total of the component (a) and the component (P) is 100 wt %), the propylene resin composition comprising 60 to 0 wt % of a propylene polymer (b) satisfying both the following requirements (b-1) and (b-2), and 40 to 100 wt % of a propylene polymer (c) satisfying the following requirements (c-1) and (c-2) (wherein the total of the component (b) and the component (c) is 100 wt %);
(b-1) the melting point Tm (b) according to differential scanning calorimetry (DSC) is 120 to 170° C.;
(b-2) the melt flow rate (MFR) (230° C., 2.16 kg load) is 0.1 to 500 g/10 min;
(c-1) the polymer shows a melting point Tm of less than 120° C. or shows no melting points according to differential scanning calorimetry (DSC);
(c-2) the melt flow rate (MFR) (230° C., 2.16 kg load) is 0.1 to 500 g/10 min.

[2] The adhesive resin composition (A) described in [1], wherein the propylene polymer (b) further satisfies the following requirement (b-3):
(b-3) the isotactic pentad fraction (mmmm) is 90 to 99.8%.

[3] The adhesive resin composition (A) described in [1] or [2], wherein the propylene polymer (c) further satisfies the following requirement (c-3):
(c-3) the polymer is a propylene/ethylene/$C_{4-20}$ α-olefin copolymer comprising 51 to 90 mol % of structural units derived from propylene, 7 to 24 mol % of structural units derived from ethylene and 0 to 25 mol % of structural units derived from a $C_{4-20}$ α-olefin (wherein the total of the structural units from propylene, the structural units from ethylene and the structural units from a $C_{4-20}$ α-olefin is 100 mol %).

[4] The adhesive resin composition (A) described in any of [1] to [3], wherein the propylene polymer (c) further satisfies at least one of the following requirements (c-4) to (c-9):
(c-4) the Shore A hardness is in the range of 20 to 90;

(c-5) the ratio of the weight average molecular weight (Mw) to the number average molecular weight (Mn), (Mw/Mn), according to gel permeation chromatography (GPC) is 1.2 to 3.5;

(c-6) the isotactic triad fraction (mm) calculated by $^{13}$C-NMR is 85 to 99.9%;

(c-7) the value B defined by Equation (1) below is 0.8 to 1.3;

$$B = \frac{M_{OE}}{2M_O \times M_E} \times 100(\%) \quad \text{(Equation 1)}$$

(wherein $M_{OE}$ is a molar fraction of the total of propylene-ethylene sequences and $C_4$ or higher α-olefin-ethylene sequences to all the dyad sequences, $M_O$ is the total of molar fractions of propylene and the $C_4$ or higher α-olefin, and $M_E$ is a molar fraction of ethylene);

(c-8) the proportion of 2,1-insertions of propylene monomers in all the propylene insertions is less than 1% according to $^{13}$C-NMR;

(c-9) the glass transition temperature (Tg) is in the range of −10° C. to −50° C.

[5] An adhesive resin composition (D) comprising 5 to 95 wt % of the adhesive resin composition (A) described in any of [1] to [4] and 95 to 5 wt % of an amorphous poly-α-olefin (APO) (d) having a melt viscosity at 190° C. of 1 to 15,000 mPa·s (wherein the total of the component (A) and the component (d) is 100 wt %).

[6] An adhesive resin composition (E) comprising 80 to 99.5 wt % of the adhesive resin composition (A) described in any of [1] to [4] or the resin composition (D) described in [5], and 20 to 0.5 wt % of a functionalized propylene polymer (e) (wherein the total of the component (A) or the component (D), and the component (e) is 100 wt %).

[7] The adhesive resin composition (E) described in [6], wherein the functionalized propylene polymer (e) is a maleated propylene polymer (e').

[8] An adhesive resin composition (F) obtained by blending 20 to 300 parts by weight of a tackifier (f) to 100 parts by weight of the adhesive resin composition (A), (D) or (E) described in any of [1] to [7].

[9] An adhesive resin composition (G) obtained by blending 20 to 300 parts by weight of a tackifier (f) and 5 to 100 parts by weight of a fluidity modifier (g) to 100 parts by weight of the adhesive resin composition (A), (D) or (E) described in any of [1] to [7].

[10] A hot melt adhesive comprising the adhesive resin composition (F) described in [8] or the adhesive resin composition (0) described in [9].

[11] A pressure sensitive adhesive comprising the adhesive resin composition (F) described in [8] or the adhesive resin composition (G) described in [9].

In the following description, the adhesive resin compositions (A), (D) and (E) may be collectively referred to as "base polymers".

Advantageous Effects of Invention

The adhesive resin compositions according to the present invention are excellent in both flexibility and heat resistance, and are therefore suitably used as hot melt adhesives, particularly in a high temperature environment. By the addition of an amorphous poly-α-olefin to the adhesive resin compositions, excellent fluidity can be obtained.

DESCRIPTION OF EMBODIMENTS

The present invention will be described in detail hereinbelow.

The description will describe components which constitute adhesive resin compositions (A), (D), (E), (F) and (G) of the present invention, as well as the contents thereof in the compositions, and will thereafter describe hot melt adhesives comprising these adhesive resin compositions. In the following description, the adhesive resin compositions (A), (D), (E), (F) and (G) may be otherwise referred to as the first, second, third, fourth and fifth adhesive resin compositions, respectively. As already mentioned, the adhesive resin compositions (A), (D) and (E) may be collectively referred to as "base polymers".

1. Inventive Adhesive Resin Compositions

The first adhesive resin composition (A) of the invention is formulated with specific proportions of an ethylene/vinyl acetate copolymer (a) and a propylene resin composition (P) formed from a propylene polymer (b) with specific property parameters and a propylene polymer (c) with specific property parameters.

The ethylene/vinyl acetate copolymer (a) used in the invention usually has a vinyl acetate content of 5 to 90 wt %, and preferably 10 to 45 wt % from the viewpoint of mechanical properties, and a melt flow rate (MFR) at 190° C. under 2.16 kg load of 0.1 to 2000 g/10 min, and preferably 0.1 to 200 g/10 min from the viewpoint of heat resistance. Exemplary commercial products include EVAFLEX (registered trademark) manufactured by DU PONT-MITSUI POLYCHEMICALS Co., LTD., and Levamelt (registered trademark) manufactured by LANXESS.

The propylene polymer (b) which constitutes the propylene resin composition (P) in the invention satisfies both of the following requirements (b-1) and (b-2), and preferably further satisfies the requirement (b-3).

(b-1) The melting point Tm (b) is 120 to 170° C., and preferably 130 to 160° C. as measured by DSC wherein the polymer is held at 200° C. for 10 minutes in a differential scanning calorimetry (DSC), cooled to −20° C. at a temperature decreasing rate of 10° C./min, held at −20° C. for 1 minute, and heated again at a temperature increasing rate of 10° C./min. (In the following description, the melting point measured under the above conditions is sometimes referred to as Tm (2nd).)

(b-2) The MFR (ASTM D1238, 230° C., 2.16 kg load) is 0.1 to 500 g/10 min, and preferably 0.1 to 100 g/10 min.

(b-3) The isotactic pentad fraction (mmmm) is 90 to 99.8%, preferably 93% to 99.7%, and more preferably 95% to 99.6%. The isotactic pentad fraction (mmmm) indicates the proportion of isotactic pentad sequences in the molecular chain according to $^{13}$C-NMR. It refers to the fraction of propylene monomer units found in the center of sequences in which five propylene monomer units are continuously meso-linked. In detail, the isotactic pentad fraction is calculated as a fraction of the mmmm peak relative to all the absorption peaks observed in a methyl carbon region of a $^{13}$C-NMR spectrum. The isotactic pentad fraction (mmmm fraction) may be determined by, for example, a method described in JP-A-2007-186664.

By satisfying the requirements (b-1) and (b-2) and preferably further the requirement (b-3), the propylene polymer (b) contributes to the improvements in bond properties, flexibility and heat resistance of the inventive adhesive resin composition.

The propylene polymer (b) in the invention may be a homopolypropylene, a propylene/$C_{2-20}$ α-olefin (except propylene) random copolymer or a propylene block copolymer as long as the polymer satisfies the above requirements. A homopolypropylene or a propylene/$C_{2-20}$ α-olefin (except propylene) random copolymer is preferable. Examples of the $C_{2-20}$ α-olefins except propylene include ethylene, 1-butene, 1-pentene, 3-methyl-1-butene, 1-hexene, 4-methyl-1-pentene, 1-octene and 1-decene. When the propylene polymer (b) is a propylene/α-olefin random copolymer, the content of structural units derived from the α-olefin is usually 0.1 to 8 mol %, preferably 0.2 to 7.5 mol %, and more preferably 0.3 to 7 mol %.

The propylene polymer (c) which constitutes the propylene resin composition (P) in the invention satisfies both of the following requirements (c-1) and (c-2), preferably further satisfies the requirement (c-3), and more preferably further satisfies at least one selected from the requirements (c-4), (c-5), (c-6), (c-7), (c-8) and (c-9).

(c-1) The polymer shows a melting point Tm (c) of less than 120° C., preferably less than 110° C., or shows no melting points according to differential scanning calorimetry (DSC). When this requirement is satisfied, the obtainable adhesive resin composition exhibits excellent flexibility and heat resistance. The phrase that the polymer shows no melting points means that any peaks due to crystal fusion indicating a heat of crystal fusion of not less than 1 J/g are not observed in the range from −150 to 200° C. The melting point Tm (c) is a value determined on a DSC curve that is recorded with respect to a specimen conditioned at 23° C.±2° C. for at least 72 hours then cooling the specimen to −40° C. and heating it at a temperature increase rate of 10° C./min. In the following description, the melting point measured under the above conditions is sometimes referred to as Tm (1st). It should be noted that the DSC measurement method differs from that for determining the melting point Tm (2nd) of the propylene polymer (b).

(c-2) The MFR (ASTM D1238, 230° C., 2.16 kg load) is 0.1 to 500 g/10 min, preferably 0.5 to 500 g/10 min, and more preferably 1 to 100 g/10 min. When the MFR is in this range, the adhesive resin composition can satisfy required flexibility and heat resistance.

(c-3) The polymer contains 51 to 90 mol %, preferably 60 to 89 mol %, and more preferably 62 to 88 mol % of structural units derived from propylene, 7 to 24 mol %, preferably 8 to 20 mol %, and more preferably 8 to 18 mol % of structural units derived from ethylene, and 0 to 25 mol %, preferably 0 to 24 mol %, and more preferably 0 to 23 mol % of structural units derived from a $C_{4-20}$ α-olefin (wherein the total of the structural units from propylene, the structural units from ethylene and the structural units from a $C_{4-20}$ α-olefin is 100 mol %). The contents (mol %) of structural units from the respective comonomers may be determined by analyzing a $^{13}$C-NMR spectrum. When the copolymer contains structural units derived from a $C_{4-20}$ α-olefin, the α-olefin is preferably 1-butene. Selecting this olefin results in a drastic improvement in the compatibility between the propylene polymer (c) and the polypropylene polymer (b) as well as in a marked improvement in properties of the obtainable adhesive resin composition (A).

(c-4) The Shore A hardness is in the range of 20 to 90, preferably 25 to 85, and more preferably 27 to 80. To determine the Shore A hardness in the invention, the propylene polymer (c) is thermally melted at 190 to 230° C. and is pressed at a cooling temperature of 15 to 25° C. to give a specimen; the specimen is stored in an environment at 23° C.±2° C. for at least 72 hours and is tested using an A-type measuring device; and the hardness is obtained by reading the scale immediately after the indenter touches the specimen (in accordance with ASTM D-2240).

(c-5) The ratio of the weight average molecular weight (Mw) to the number average molecular weight (Mn), (Mw/Mn), according to gel permeation chromatography (GPC) is 1.2 to 3.5, preferably 1.4 to 3.0, and more preferably 1.6 to 2.6. The propylene polymer (c) having this molecular weight distribution contains small amounts of low-molecular weight molecules, and thus stickiness is preferably suppressed. Further, the compatibility with the propylene polymer (b) is markedly improved because polymers having such a narrow molecular weight distribution generally have a narrow composition distribution.

(c-6) The isotactic triad fraction (mm) calculated by $^{13}$C-NMR is 85 to 99.9%, and preferably 87 to 99.8%. In the invention, the isotactic triad fraction (mm) indicates the fraction of the methyl groups of the second units in segments composed of three propylene units continuously linked with an isotactic configuration. This fraction may be obtained by, for example, a $^{13}$C-NMR method described in WO 2004/087775. The propylene polymer (c) having this isotactic triad fraction (mm) does not completely lose crystallinity even when large amounts of comonomers such as ethylene and 1-butene are copolymerized. As a result, excellent mechanical strength, high break elongation and good rubber elasticity are obtained. Further, the inventive adhesive resin composition achieves markedly improved properties, in particular heat resistance, as a result of partial incorporation of the propylene copolymer (c) into the crystal of the propylene polymer (b). Thus, as will be described later, the propylene polymer (b) is usually allowed to be present at 3 wt % to 40 wt % in the propylene polymer composition (P) in the case where the inventive adhesive is to be used in an environment requiring high heat resistance.

(c-7) The value B defined by Equation (1) below is 0.8 to 1.3, preferably 0.9 to 1.2, and more preferably 0.9 to 1.1.

$$B = \frac{M_{OE}}{2M_O \times M_E} \times 100(\%) \quad \text{(Equation 1)}$$

(In the equation, $M_{OE}$ is a molar fraction of the total of propylene-ethylene sequences and $C_4$ or higher α-olefin-ethylene sequences to all the dyad sequences, $M_O$ is the total of molar fractions of propylene and the $C_4$ or higher α-olefin, and $M_E$ is a molar fraction of ethylene.)

The value B may be determined by $^{13}$C-NMR based on reports such as reports by G. J. Ray (Macromolecules, 10, 773 (1977)), J. C. Randall (Macromolecules, 15, 353 (1982); J. Polymer Science, Polymer Physics Ed., 11, 275 (1973)), and K. Kimura (Polymer, 25, 441 (1984)).

The value B in the above range ensures that the compatibility with the propylene polymer (b) is further improved. If the value B exceeds the above range, the polymer has a primary molecular structure similar to an alternating copolymer in which the monomers (propylene, ethylene and the optional $C_{4-20}$ α-olefin) are bonded alternately. Such a propylene polymer (c) exhibits poor compatibility with the propylene polymer (b). If the value B is below the aforementioned range, the polymer has a primary molecular structure similar to a block copolymer in which the monomers form respective blocks. Such a propylene polymer (c) exhibits poor compatibility with the propylene polymer (b).

(c-8) The proportion of 2,1-insertions of propylene monomers in all the propylene insertions is less than 1%, preferably 0 to 0.5%, and more preferably 0 to 0.1% according to $^{13}$C-NMR. A proportion of 2,1-insertions (inversion) of propylene monomers in all the propylene insertions which satisfies the requirement (c-8) means that the propylene polymer (c) has excellent regioregularity. That is, similarly to the requirement (c-6), it is a preferred embodiment of the invention that the propylene polymer (c) has few 2,1-insertions that are an obstacle to crystallinity. The proportion of 2,1-insertions of propylene monomers in all the propylene insertions may be calculated according to a method described in JP-A-H07-145212. In a particularly preferred embodiment, no peaks are observed in the range from 15.0 to 17.5 ppm.

(c-9) The glass transition temperature (Tg) is observed in the range of −10° C. to −50° C., and preferably −15° C. to −40° C. The polymer having this glass transition temperature can give practically sufficient low-temperature properties to the inventive adhesive resin composition (A).

The propylene polymer (c) in the invention may be generally obtained by copolymerizing propylene, ethylene and optionally a $C_{4-20}$ α-olefin in the presence of a metallocene catalyst. For example, the polymer may be obtained by copolymerizing the olefins using any of metallocene compounds bridged via a dimethylsilanediyl group and having biscyclopentadiene rings or derivatives thereof as ligands as disclosed in Journal of Organometallic Chemistry Vol. 369, 359-370 (1989) and JP-A-2003-518171, metallocene compounds described in JP-A-H03-163088, and metallocene compounds having a cyclopentadienyl group and a fluorenyl group as base skeletons as disclosed in WO 2004/087775, in combination with known aluminoxane compounds or organoboron cocatalysts. In Examples of the present invention, commercial products or polymers prepared under polymerization conditions similar to those in Examples 1e to 4e described in WO 2004/087775 were used as the propylene polymers (c).

The propylene resin composition (P) in the invention is composed of the propylene polymer (b) and the propylene polymer (c). That is, the propylene resin composition (P) contains the propylene polymer (b) at 0 to 60 wt %, from the viewpoint of heat resistance preferably 3 to 40 wt %, and more preferably 5 to 30 wt %, and contains the propylene polymer (c) at 40 to 100 wt %, from the viewpoint of heat resistance preferably 60 to 97 wt %, and more preferably 70 to 95 wt % (wherein the total of the component (b) and the component (c) is 100 wt %). These proportions of the propylene polymer (b) and the propylene polymer (c) ensure that the obtainable propylene resin composition (P) exhibits excellent flexibility, heat resistance, rubber elasticity and transparency. The propylene resin composition (P) in the invention may be obtained by any methods without limitation. Examples include a method in which the component (b) and the component (c) are polymerized simultaneously or successively to give a composition, a method in which the component (b) and the component (c) are prepared separately and mixed with each other, and a method in which one of the component (b) and the component (c) is produced first and the produced polymer is added during steps in the production of the other.

The first adhesive resin composition (A) of the invention is composed of 30 to 98 wt %, preferably 35 to 90 wt % of the ethylene/vinyl acetate copolymer (a), and 2 to 70 wt %, preferably 10 to 65 wt % of the propylene resin composition (P) (wherein the total of the component (a) and the component (P) is 100 wt %). These proportions of the ethylene/vinyl acetate copolymer (a) and the propylene resin composition (P) ensure that the adhesive resin composition (A) exhibits hot melt adhesive performance with good flexibility and heat resistance. The first adhesive resin composition (A) in the invention may be obtained by any methods without limitation. Examples include a method in which the component (a) and the component (P) are melt kneaded with each other to give a composition, and a method in which the three components, namely, the component (a), the component (b) and the component (c) are melt kneaded together simultaneously.

The second adhesive resin composition (3) of the invention is composed of 95 to 5 wt %, preferably 95 to 20 wt %, more preferably 95 to 50 wt % of the first adhesive resin composition, and 5 to 95 wt %, preferably 5 to 80 wt %, more preferably 5 to 50 wt % of an amorphous poly-α-olefin (APO) (d) having a melt viscosity at 190° C. of 1 to 15,000 mPa·s (wherein the total of the component (A) and the component (d) is 100 wt %). These proportions ensure that the adhesive resin composition (D) exhibits good flexibility and heat resistance. The amorphous poly-α-olefin (APO) (d) used in the invention is a polyolefin that has a melt viscosity at 190° C. of 1 to 15,000 mPa·s, preferably 10 to 12,000 mPa·s, and usually has a melt flow rate (MFR) (230° C., 2.16 kg load) of above 500 g/10 min, preferably not less than 600 g/10 min, more preferably not less than 700 g/10 min. Any polyolefins may be used without limitation as long as these properties are satisfied. The amorphous poly-α-olefin is characterized by being amorphous or low crystalline. Any known such polymers may be suitably used, with examples including propylene homopolymers, propylene/ethylene copolymers, propylene/1-butene copolymers and propylene/ethylene/1-butene copolymers. Examples of commercial products include VISTAC (registered trademark) manufactured by CHISSO CORPORATION, VISCOL (registered trademark) manufactured by Sanyo Chemical Industries, Ltd., and VESTOPLAST (registered trademark) manufactured by Degussa. In Examples of this application described later, propylene homopolymer APAO (registered trademark) (RT2180) manufactured by REXTAC was used.

The third adhesive resin composition (E) of the invention is an adhesive resin composition (E1) composed of 80 to 99.5 wt %, preferably 85 to 99.0 wt % of the adhesive resin composition (A), and 20 to 0.5 wt %, preferably 15 to 1.0 wt % of a functionalized propylene polymer (e) (wherein the total of the component (A) and the component (e) is 100 wt %), or is an adhesive resin composition (E2) composed of 80 to 99.5 wt %, preferably 85 to 99.0 wt % of the adhesive resin composition (D), and 20 to 0.5 wt %, preferably 15 to 1.0 wt % of a functionalized propylene polymer (e) (wherein the total of the component (D) and the component (e) is 100 wt %). These proportions ensure that the adhesive resin composition (E) exhibits good flexibility and heat resistance.

The functionalized propylene polymer (e) used in the invention is a polymer in which carboxyl groups, hydroxyl groups, acid anhydride groups, amide groups, imide groups or urethane groups have been introduced into the main chain or side chains of the polymer. In the invention, a maleated propylene polymer (e') is favorably used which is easily prepared or is easily available. The maleated propylene polymer (e') is a modified product of a propylene polymer with maleic acid or maleic acid anhydride. The modification may be performed by any of known methods. For example, maleic acid or maleic acid anhydride and a peroxide may be added to a propylene polymer and the mixture may be kneaded using a single screw kneading extruder or a twin screw kneading extruder so as to perform a graft reaction. When the composition is used in a hot melt adhesive or a pressure sensitive adhesive according to the present invention, the maleic acid modification rate is preferably 0.1 to 10 wt % in terms of the content of maleic acid groups.

The fourth adhesive resin composition (F) of the invention is obtained by blending 20 to 300 parts by weight, preferably 30 to 200 parts by weight, and more preferably 30 to 150 parts by weight of a tackifier (f) to 100 parts by weight of the adhesive resin composition (A), (D) or (E). This amount of the tackifier (f) ensures that the adhesive resin composition (F) exhibits good flexibility and heat resistance. For example, the tackifier (f) used in the invention may be at least one resin selected from natural rosins, modified rosins, polyterpene resins, synthetic petroleum resins, coumarone resins, phenolic resins, xylene resins, styrene resins, low-molecular weight styrene resins and isoprene resins. Of these, rosin resins, polyterpene resins and synthetic petroleum resins are preferable, and those having an aliphatic structure and/or an alicyclic structure are more preferable.

The fifth adhesive resin composition (G) of the invention is obtained by blending 20 to 300 parts by weight, preferably 30 to 200 parts by weight, and more preferably 30 to 150 parts by weight of the tackifier (f) as well as 5 to 100 parts by weight, preferably 10 to 80 parts by weight, and more preferably 10 to 50 parts by weight of a fluidity modifier (g) to 100 parts by weight of the adhesive resin composition (A), (D) or (E). These amounts of the tackifier (f) and the fluidity modifier (g) ensure that the adhesive resin composition (G) exhibits good flexibility and heat resistance. For example, the fluidity modifier (g) may be any of known substances without limitation as long as it can lower the melt viscosity of the inventive adhesive resin composition, with examples including paraffin process oils, polyolefin waxes, low-molecular weight polyolefins, phthalate esters, adipate esters, fatty acid esters, glycols, epoxy polymer plasticizers and naphthene oils. In particular, such substances as polyolefin waxes, low-molecular weight polyolefins and paraffin waxes are preferable.

The inventive adhesive resin composition (A), (D), (E), (F) or (G) may contain various additives such as inorganic fillers, antioxidants and weathering stabilizers while still achieving the object of the invention. The adhesive resin compositions of the invention may be usually obtained by melt mixing the aforementioned essential components which constitute the composition as well as optional various additives such as inorganic fillers, antioxidants and weathering stabilizers. Any melt mixing method which is known in the art may be utilized. An exemplary method is to mix the components mechanically using a mixing device such as an extruder, an open roll mill, a Banbury mixer, a kneader or a melt mixing tank. The melt mixing temperature is usually 100 to 250° C., and preferably 160 to 230° C.

2. Inventive Adhesives

The inventive adhesive resin composition (A), (D), (E), (F) or (G) has both flexibility and heat resistance. Further, the inventive composition has an appropriate solidification time to allow for a long open time. Accordingly, the inventive adhesive resin compositions can be favorably used as hot melt adhesives and pressure sensitive adhesives, and particularly favorably used as hot melt adhesives.

The inventive adhesive resin composition (A), (D), (E), (F) or (G) can be used as an adhesive for bonding various adherends together such as plastics, glasses, metals, fibers, synthetic and natural leathers, papers and wood materials. In particular, the advantageous effects of the invention become marked when at least one of the adherends is a plastic material. Especially, the inventive adhesive resin composition (A), (D), (E), (F) or (G) can be favorably used as an adhesive for bonding polyolefin materials, particularly preferably polypropylene materials, which are used in a high temperature environment.

EXAMPLES

The present invention will be described in more detail based on Examples hereinbelow without limiting the scope of the invention to such Examples.

First, components used to form compositions in Examples of the invention will be described.

(1) Components for Forming Compositions (1-1) Ethylene/Vinyl Acetate Copolymer (EVA) (a):
EVAFLEX (registered trademark) (brand name: EV450) manufactured by DU PONT-MITSUI POLYCHEMICALS CO., LTD.
MFR (190° C., 2.16 kgf)=15 g/10 min
Vinyl acetate content=19 wt %
Physical properties of the EVA (a) are described in Comparative Example 1-1 in Table 1.

(1-2-1) Random Polypropylene (Random PP) (b1) Corresponding to Propylene Polymer (b)
Random PP having 94 mol % propylene content
Tm (2nd)=140.6° C.
MFR (230° C., 2.16 kgf)=7.0 g/10 min
Stereoregularity: mmmm=98.5%

(1-2-2) Random Polypropylene (Random PP) (b2) Corresponding to Propylene Polymer (b)
Random PP having 95 mol % propylene content
Tm (2nd)=142.0° C.
MFR (230° C., 2.16 kgf)=59 g/10 min (1-3-1) Propylene/Ethylene/1-Butene Copolymer (PEER) (c1) Corresponding to Propylene Polymer (c)
Ethylene, propylene and 1-butene as raw materials were polymerized in a hexane solution using a continuous polymerization apparatus in the presence of diphenylmethylene (3-tert-butyl-5-ethylcyclopentadienyl) (2,7-di-tert-butylfluorenyl)zirconium dichloride prepared by a method described in WO 2006/098452 and methylaluminoxane (manufactured by Tosoh Finechem Corporation, 0.3 mmol in terms of aluminum) as a polymerization catalyst and a cocatalyst. Thus, a propylene/ethylene/1-butene copolymer (PEER) (c1) was obtained. Physical properties were found to be as follows.
Tm (1st)=51.7° C.
MFR (230° C., 2.16 kgf)=6.5 g/10 min
Comonomer contents ethylene: 14.0 mol % propylene: 66.5 mol %
1-butene: 19.5 mol %
Shore A hardness=38
Molecular weight distribution: Mw/Mn=2.09
Stereoregularity: mm=90.5%
Value B=1.0
Regioregularity: proportion of 2,1-insertions of propylene in all propylene insertions <0.1%
Tg=−29.5° C.

(1-3-2) Propylene/Ethylene Copolymer (PER) (c2) Corresponding to Propylene Polymer (c)

VISTAMAXX (registered trademark) 6202 manufactured by Exxon Mobil Chemical Co. was used as a propylene/ethylene copolymer (PER) (c2). Physical properties were found to be as follows.
Tm (1st)=47.8° C., 110.6° C.
Tm (2nd)=108.8° C.
MFR (230° C., 2.16 kgf)=18 g/10 min
Comonomer contents ethylene: 22.0 mol %
propylene: 78.0 mol %
Shore A hardness=61
Molecular weight distribution: Mw/Mn=2.05
Tg=−31.8° C.

(1-4) Amorphous Poly-α-Olefin (APO) (d):

APAO (registered trademark) (brand name: RT2180, propylene homopolymer) manufactured by REXTAC
Melt viscosity (190° C.)=8000 mPa·s (1-5) Functionalized Propylene Polymer (e):

Modified PP (brand name: Umex (registered trademark) 1010) manufactured by Sanyo Chemical Industries, Ltd.

(1-6) Tackifier (f):

Alicyclic saturated hydrocarbon resin (brand name: ARKON (registered trademark) P-125) manufactured by ARAKAWA CHEMICAL INDUSTRIES, LTD.

(1-7) Fluidity Modifier (g):

Paraffin wax (brand name: 140) manufactured by NIPPON SEIRO CO., LTD.

Next, methods for measuring the physical properties of the above components will be described.

(2) Methods for Measuring Physical Properties of Components

[MFR (Melt Flow Rate)]
The MFR was measured at 190° C. or 230° C. under 2.16 kgf in accordance with ASTM D1238.

[Tm (Melting Point)]
Tm (1st): A specimen conditioned at 23° C.±2° C. for at least 72 hours was cooled to −40° C. and was thereafter heated at a temperature increase rate of 10° C./min, thereby recording a DSC curve. The melting point observed during this process was obtained as Tm (1st).

Tm (2nd): In a DSC, a specimen was held at 200° C. for 10 minutes, cooled to −20° C. at a temperature decreasing rate of 10° C./min, held at −20° C. for 1 minute, and heated again at a temperature increasing rate of 10° C./min, thereby recording a DSC curve. The melting point observed during this process was obtained as Tm (2nd).

[Stereoregularity]
The isotactic triad fraction (mm) and the isotactic pentad fraction (mmmm) were determined by analyzing a $^{13}$C-NMR spectrum.

[Contents of Comonomers (Chemical Compositions)]
The contents of comonomers were determined by analyzing a $^{13}$C-NMR spectrum.

[Shore A Hardness (Surface Hardness)]
The polymer was preheated for 5 minutes with a hydraulic hot press forming machine set at 190° C. and was then pressed for 2 minutes. Immediately thereafter, the polymer was cooled in a cooling tank set at 20° C. for 4 minutes to give a 3 mm thick pressed sheet. During the press forming, a 100 μm PET film (LUMIRROR (registered trademark) manufactured by TORAY INDUSTRIES INC.) was used as a release film. The pressed sheet was stored in an environment at 23° C.±2° C. for 72 hours and was tested using an A-type measuring device. The Shore A hardness was determined by reading the scale immediately after the indenter touched the sheet (in accordance with ASTM D-2240).

[Mw/Mn (Molecular Weight Distribution)]
The Mw/Mn was measured by GPC (gel permeation chromatography) using orthodichlorobenzene solvent (mobile phase) at a column temperature of 140° C. (relative to polystyrenes, Mw: weight average molecular weight, Mn: number average molecular weight). In detail, the molecular weight distribution (Mw/Mn) was determined as follows using gel permeation chromatograph Alliance GPC-2000 manufactured by Waters Corporation. Two TSKgel GNH6-HT columns and two TSKgel GNH6-HTL columns, each having a diameter of 7.5 mm and a length of 300 mm, were used as the separation columns. The column temperature was set at 140° C. The mobile phase was o-dichlorobenzene (Wako Pure Chemical Industries, Ltd.) containing 0.025 wt % of BHT (Takeda Pharmaceutical Company Limited) as an antioxidant, and was flowed at 1.0 ml/min. The sample concentration was 15 mg/10 ml, and the sample injection volume was 500 μl. A differential refractometer was used as a detector. Standard polystyrenes manufactured by Tosoh Corporation were used for the molecular weights Mw<1000 and Mw>4×10$^6$, and those manufactured by Pressure Chemical Company were used for the molecular weights 1000≤Mw≤4×10$^6$.

[Value B]
The value B was calculated using Equation 1 below based on data obtained by analyzing $^{13}$C-NMR spectrum.

$$B = \frac{M_{OE}}{2M_O \times M_E} \times 100(\%) \quad \text{(Equation 1)}$$

(In the equation, $M_{OE}$ is a molar fraction of the total of propylene-ethylene sequences and $C_4$ or higher α-olefin-ethylene sequences to all the dyad sequences, $M_O$ is the total of molar fractions of propylene and the $C_4$ or higher α-olefin, and $M_E$ is a molar fraction of ethylene.)

[Tg (Glass Transition Temperature)]
A specimen conditioned at 23° C.±2° C. for at least 72 hours was cooled to −40° C. and was thereafter heated at a temperature increase rate of 10° C./min, thereby recording a DSC curve. The obtained spectrum was analyzed to determine the Tg.

Next, methods for preparing adhesive resin compositions will be described.

(3) Methods for Preparing Compositions (3-1) Examples 1-1 to 1-7 (Adhesive Resin Compositions (A), (D) and (E) (Base Polymers)) and Comparative Examples 1-1 to 1-3

EV450 as the ethylene/vinyl acetate copolymer (a), random PP as the propylene polymer (b), PBER or PER as the propylene polymer (c), RT2180 manufactured by REXTAC as APO (d), and Umex 1010 as the maleated propylene polymer (e') were melt kneaded (350 g, 190° C., 5 min, 40 rpm) with formulations described in Table 1 using Labo Plastomill (manufactured by Toyo Seiki Seisaku-Sho, Ltd.) to give adhesive resin compositions.

(3-2) Examples 2-1 to 2-3 (Adhesive Resin Compositions (F) and (G)) and Comparative Example 2-1

In a stream of nitrogen, EV450 as the ethylene/vinyl acetate copolymer (a), random PP as the propylene polymer (b), PEER as the propylene polymer (c), RT2180 manufactured by REXTAC as APO (d), Umex 1010 as the maleated propylene polymer (e'), ARKON P-125 manufactured by ARAKAWA CHEMICAL INDUSTRIES, LTD. as the tackifier (f), and paraffin wax 140 manufactured by NIPPON SEIRO CO., LTD. as the fluidity modifier (g) were melt kneaded (250 g, 230° C., 1 h) with formulations described in Table 2 using Three-One Motor Agitator (manufactured by Shinto Scientific Co., Ltd.) to give adhesive resin compositions.

(4) Evaluation Methods and Results (4-1) Basic Properties of Adhesive Resin Compositions of Comparative Examples 1-1 to 1-3 and Those of Adhesive Resin Compositions of Examples 1-1 to 1-7 (Adhesive Resin Compositions (A), (D) and (E) (Base Polymers))

The adhesive resin composition was preheated for 5 minutes with a hydraulic hot press forming machine set at 190° C. and was then pressed for 2 minutes. Immediately thereafter, the composition was cooled in a cooling tank set at 20° C. for 4 minutes to give a 2 mm thick pressed sheet. During the press forming, a 100 μm PET film (LUMIRROR (registered trademark) manufactured by TORAY INDUSTRIES INC.) was used as a release film. The pressed sheet was stored in an environment at 23° C.±2° C. for 72 hours and was tested to evaluate the following physical properties. The results are described in Table 1 and in FIGS. 1 to 4.

[Shore A Hardness (Surface Hardness)]

The Shore A hardness was determined using an A-type measuring device by reading the scale immediately after the indenter touched the sheet in accordance with ASTM D-2240.

[Mechanical Properties]

The sheet was tested in accordance with JIS K7113-2 to determine the tensile strength at break (TS), the elongation at break (between chucks, EL) and the Young's modulus (YM) (measurement temperature: 23° C., stress speed: 200 mm/min, maximum strain: 800%). When the sheet was not broken at a strain of 800%, the stress at this strain was obtained as TS.

[Thermal Creep Resistance (Heat Resistance)]

Thermal creep resistance was measured with a viscoelastometer (RSA-III manufactured by TA Instruments). In detail, the upper and lower ends of the test piece were fixed with chucks lightly at room temperature and were fixed tightly after the test piece was cooled to −40° C. The temperature was then increased to 80° C. When the temperature became stabilized, a tensile force of 0.1 MPa was applied and the strain (%) was measured. The letter "A" in Table 1 indicates that the sheet had become fully stretched within 30 minutes before the termination of the measurement. For those sheets that had become "fully stretched", the time from the initiation of the measurement until the sheet became fully stretched was measured.

TABLE 1

| | | Unit | Comp. Ex. 1-1 | Ex. 1-1 | Ex. 1-2 | Ex. 1-3 | Ex. 1-4 | Ex. 1-5 | Comp. Ex. 1-2 | Comp. Ex. 1-3 | Ex. 1-6 | Ex. 1-7 |
|---|---|---|---|---|---|---|---|---|---|---|---|---|
| Polymer | EVA (a) | wt % | 100 | 70 | 40 | 70 | 70 | 40 | 70 | 70 | 70 | 70 |
| | PP (b1) | wt % | | 6 | 12 | 4 | 4 | 10 | | | | 6 |
| | PP (b2) | wt % | | | | | | | | 6 | | |
| | PBER (c1) | wt % | | 24 | 48 | 16 | 16 | 40 | | | | |
| | PER (c2) | wt % | | | | | | | | | 30 | 24 |
| | APO (d) | wt % | | | | 10 | | | 30 | 24 | | |
| | Modified PP (e) | wt % | | | | | 10 | 10 | | | | |
| Flexibility | Shore A | — | 90 | 86 | 83 | 87 | 90 | 89 | 88 | 90 | 85 | 88 |
| Mechanical properties | TS | MPa | 16 | 9.3 | >15 | 8.7 | 13 | 17 | 7.3 | 6.2 | 8.4 | 8.5 |
| | EL | % | 630 | 480 | >800 | 490 | 490 | 750 | 450 | 380 | 470 | 460 |
| | YM | MPa | 48 | 37 | 28 | 40 | 67 | 58 | 48 | 60 | 33 | 41 |
| Heat resistance | 80° C. | %[1] | A (505) | 26% | 10% | A (1475) | 12% | 4% | A (35) | A (175) | A (605) | 36% |

[1]The letter "A" indicates that the sheet became fully stretched before the termination of the measurement. The numbers in parentheses indicate the time (sec) from the initiation of the measurement until the sheet became fully stretched.

(4-2) Applied Properties of Adhesive Resin Compositions of Comparative Example 2-1 and Examples 2-1 to 2-3

Figure 1:
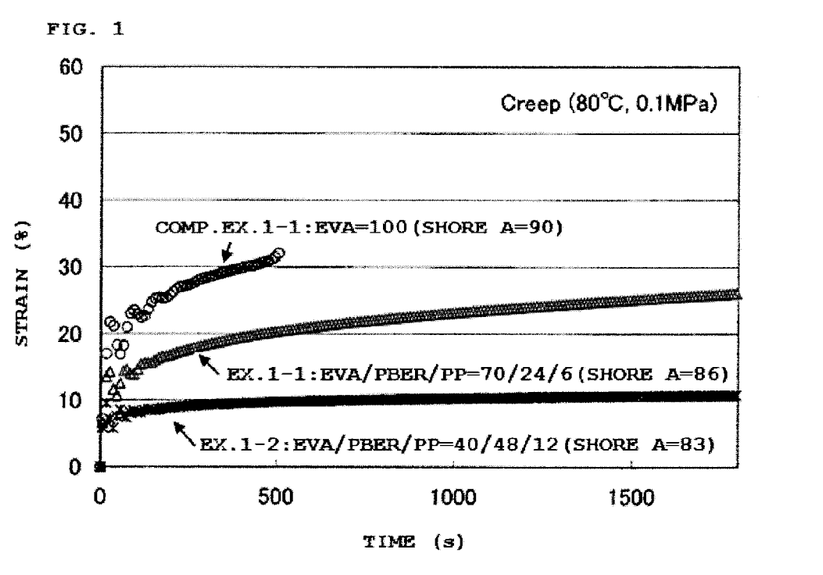
FIG. 1 is a diagram illustrating changes in amounts of creep with time measured at 80° C. and 0.1 MPa with respect to EVA/PBER/PP adhesive resin compositions described in Comparative Example 1, Example 1-1 and Example 1-2.
Figure 2:
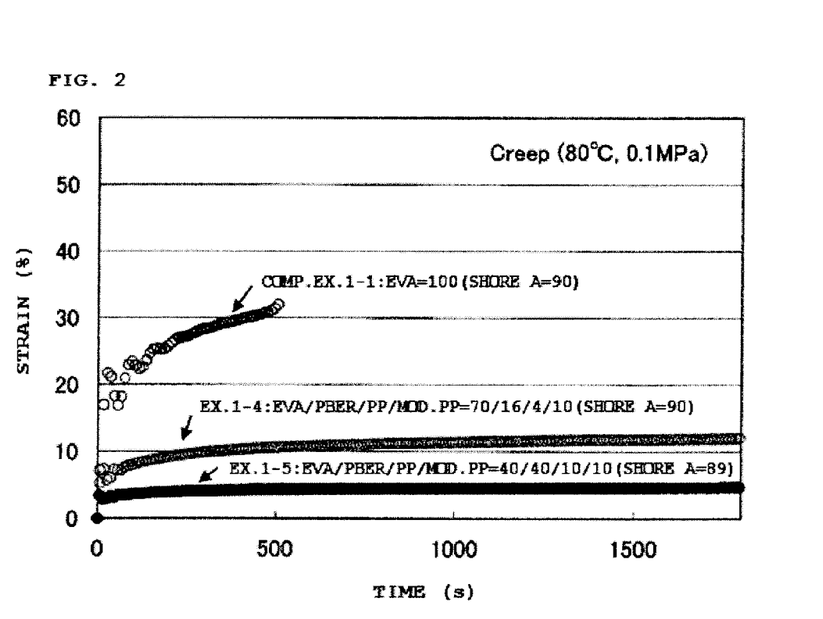
FIG. 2 is a diagram illustrating changes in amounts of creep with time measured at 80° C. and 0.1 MPa with respect to EVA/PBER/PP/modified PP adhesive resin compositions described in Comparative Example 1, Example 1-4 and Example 1-5.
Figure 3:
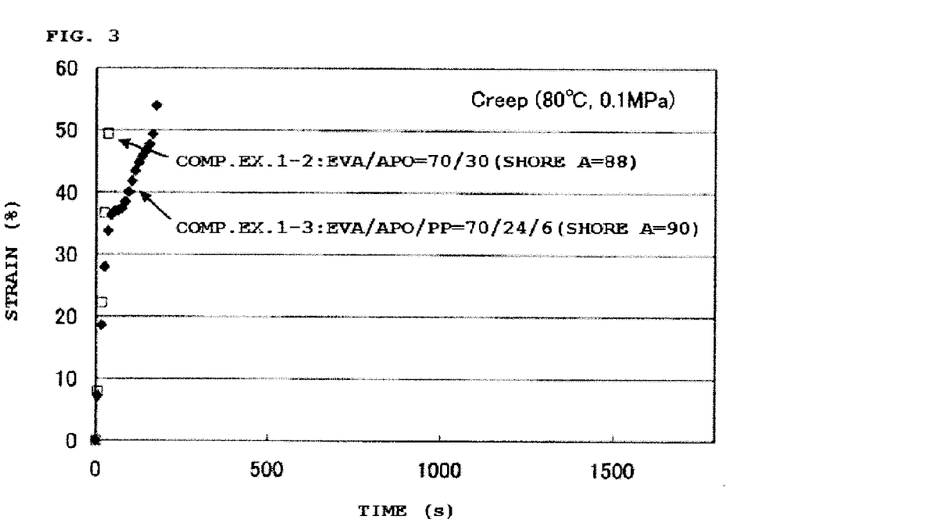
FIG. 3 is a diagram illustrating changes in amounts of creep with time measured at 80° C. and 0.1 MPa with respect to EVA/APAO(/PP) adhesive resin compositions described in Comparative Example 1-2 and Comparative Example 1-3.
Figure 4:
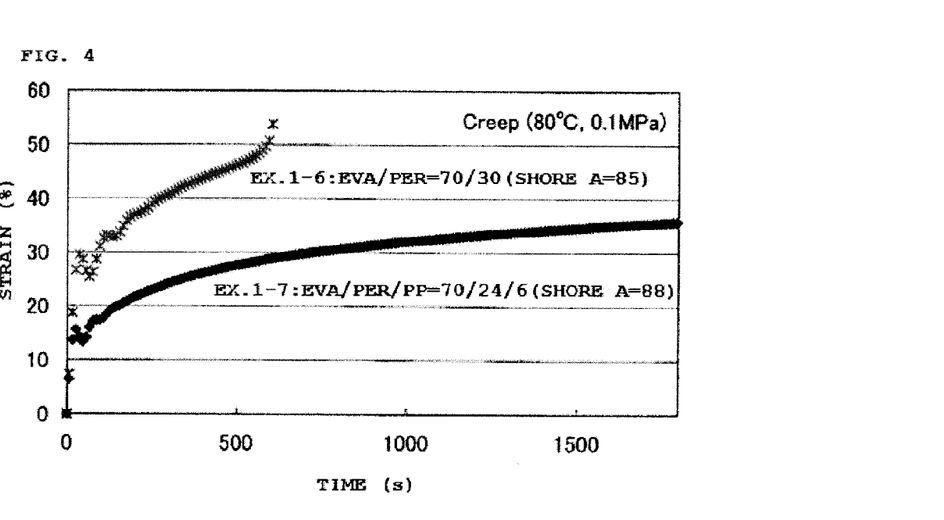
FIG. 4 is a diagram illustrating changes in amounts of creep with time measured at 80° C. and 0.1 MPa with respect to EVA/PER(/PP) adhesive resin compositions described in Example 1-6 and Example 1-7.
Figure 5:
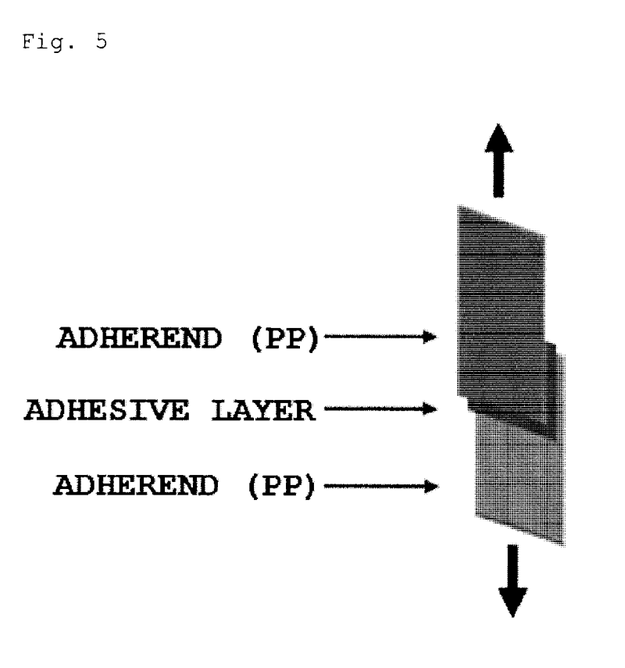
FIG. 5 is a view schematically illustrating an adhesion evaluation test with respect to PP pressed sheets performed in the present invention.

The adhesive composition was applied (application temperature: 180° C., application amount: 0.4 g) to an adherend (a PP pressed sheet, thickness: 2 mm, width: 25 mm, length: 66 mm) with a hot melt gun (HAKKO MELTER manufactured by Hakko Corporation, model: 806-1, ejection system: piston using spring pressure). Immediately thereafter, an identical adherend was pressed from top of the adhesive composition so as to sandwich the adhesive (pressing conditions: 10 kgf, 1 min). The assembly was stored in an environment at 23° C.±2° C. for 72 hours and was thereafter subjected to a tensile test as illustrated in FIG. 5 (200 mm/min, 23° C., 40° C. or 60° C.) to measure the shear peel strength. The maximum stress was obtained as the peel strength (adhesive strength). The results are described in Table 2. The fracture modes were observed. In Table 2, (B) indicates interface failure, (C) cohesive failure, and (B/C) a mixture of interface failure and cohesive failure.

TABLE 2

| | | Unit | Comp. Ex. 2-1 | Ex. 2-1 | Ex. 2-2 | Ex. 2-3 |
|---|---|---|---|---|---|---|
| Polymer | EVA (a) | wt % | 50 | 35 | 35 | 35 |
| | PP (b1) | wt % | | 3 | 2 | 2 |
| | PBER (c1) | wt % | | 12 | 8 | 8 |
| | APO (d) | wt % | | | 5 | |
| | Modified PP (e) | wt % | | | | 5 |
| Tackifier | Petroleum resin (f) | wt % | 40 | 40 | 40 | 40 |
| Fluidity modifier | Paraffin wax (g) | wt % | 10 | 10 | 10 | 10 |
| Adhesive strength[1] | 23° C. | N/25 mm | 350 (B/C) | 290 (B) | 47 (B) | 600 (B) |
| | 40° C. | N/25 mm | 630 (C) | 740 (C) | 750 (C) | 700 (C) |
| | 60° C. | N/25 mm | 150 (C) | 180 (C) | 190 (C) | 250 (C) |

[1](B): interface failure, (C): cohesive failure, (B/C): mixture of interface failure and cohesive failure

INDUSTRIAL APPLICABILITY

The present invention relates to adhesive resin compositions excellent in flexibility and heat resistance, and to hot melt adhesives obtained from the compositions. The inventive compositions exhibit higher flexibility, adhesive strength and thermal creep resistance than heretofore achieved even when used as hot melt adhesives for bonding adherends which are exposed to high temperatures for a long time. Thus, the application of the inventive compositions and adhesives will be further broadened to various fields.

The invention claimed is:

1. An adhesive resin composition (A) comprising:
   30 to 98 wt % of an ethylene/vinyl acetate copolymer (a), and
   70 to 2 wt % of a propylene resin composition (P) (wherein the total of the component (a) and the component (P) is 100 wt %), the propylene resin composition comprising 60 to 0 wt % of a propylene polymer (b) satisfying both the following requirements (b-1) and (b-2), and 40 to 100 wt % of a propylene polymer (c) satisfying the following requirements (c-1) and (c-2) (wherein the total of the component (b) and the component (c) is 100 wt %);
   (b-1) the melting point Tm (b) according to differential scanning calorimetry (DSC) is 120 to 170° C.;
   (b-2) the melt flow rate (MFR) (230° C., 2.16 kg load) is 0.1 to 500 g/10 min;
   (c-1) the polymer shows a melting point Tm (c) of less than 120° C. or shows no melting points according to differential scanning calorimetry (DSC);
   (c-2) the melt flow rate (MFR) (230° C., 2.16 kg load) is 0.1 to 500 g/10 min.

2. The adhesive resin composition (A) according to claim 1, wherein the propylene polymer (b) further satisfies the following requirement (b-3):
   (b-3) the isotactic pentad fraction (mmmm) is 90 to 99.8%.

3. The adhesive resin composition (A) according to claim 1, wherein the propylene polymer (c) further satisfies the following requirement (c-3):
   (c-3) the polymer is a propylene/ethylene/$C_{4-20}$ α-olefin copolymer comprising 51 to 90 mol % of structural units derived from propylene, 7 to 24 mol % of structural units derived from ethylene and 0 to 25 mol % of structural units derived from a $C_{4-20}$ α-olefin (wherein the total of the structural units from propylene, the structural units from ethylene and the structural units from a $C_{4-20}$ α-olefin is 100 mol %).

4. The adhesive resin composition (A) according to claim 1, wherein the propylene polymer (c) further satisfies at least one of the following requirements (c-4) to (c-9):
   (c-4) the Shore A hardness is in the range of 20 to 90;
   (c-5) the ratio of the weight average molecular weight (Mw) to the number average molecular weight (Mn), (Mw/Mn), according to gel permeation chromatography (GPC) is 1.2 to 3.5;
   (c-6) the isotactic triad fraction (mm) calculated by $^{13}$C-NMR is 85 to 99.9%;
   (c-7) the value B defined by Equation (1) below is 0.8 to 1.3;

$$B = \frac{M_{OE}}{2M_O \times M_E} \times 100(\%) \qquad \text{(Equation 1)}$$

(wherein $M_{OE}$ is a molar fraction of the total of propylene-ethylene sequences and $C_4$ or higher α-olefin-ethylene sequences to all the dyad sequences, $M_O$ is the total of molar fractions of propylene and the $C_4$ or higher α-olefin, and $M_E$ is a molar fraction of ethylene);
   (c-8) the proportion of 2,1-insertions of propylene monomers in all the propylene insertions is less than 1% according to $^{13}$C-NMR;
   (c-9) the glass transition temperature (Tg) is in the range of −10° C. to −50° C.

5. An adhesive resin composition (D) comprising 5 to 95 wt % of the adhesive resin composition (A) described in claim 1 and 95 to 5 wt % of an amorphous poly-α-olefin (APO) (d) having a melt viscosity at 190° C. of 1 to 15,000 mPa·s (wherein the total of the component (A) and the component (d) is 100 wt %).

6. An adhesive resin composition (E) comprising 80 to 99.5 wt % of the adhesive resin composition (A) described in claim 1 or the adhesive resin composition (D) comprising 5 to 95 wt % of the adhesive resin composition (A) described in-claim 1 and 95 to 5 wt % of an amorphous poly-α-olefin (APO) (d) having a melt viscosity at 190° C. of 1 to 15,000 mPa·s (wherein the total of the component (A) and the component (d) is 100 wt %), and 20 to 0.5 wt % of a functionalized propylene polymer (e) (wherein the total of the component (A) or the component (D), and the component (e) is 100 wt %).

7. The adhesive resin composition (E) according to claim 6, wherein the functionalized propylene polymer (e) is a maleated propylene polymer (e').

8. An adhesive resin composition (F) obtained by blending 20 to 300 parts by weight of a tackifier (f) to 100 parts by weight of the adhesive resin composition (A) described in claim 1.

9. An adhesive resin composition (G) obtained by blending 20 to 300 parts by weight of a tackifier (f) and 5 to 100 parts by weight of a fluidity modifier (g) to 100 parts by weight of the adhesive resin composition (A) described in claim 1.

10. A hot melt adhesive comprising the adhesive resin composition (F) obtained by blending 20 to 300 parts by weight of a tackifier (f) to 100 parts by weight of the adhesive resin composition (A) described in claim 1, or the adhesive resin composition (G) obtained by blending 20 to 300 parts by weight of a tackifier (f) and 5 to 100 parts by weight of a fluidity modifier (g) to 100 parts by weight of the adhesive resin composition (A) described in claim 1.

11. A pressure sensitive adhesive comprising the adhesive resin composition (F) obtained by blending 20 to 300 parts by weight of a tackifier (f) to 100 parts by weight of the adhesive resin composition (A) described in-claim 1, or the adhesive resin composition (G) obtained by blending 20 to 300 parts by weight of a tackifier (f) and 5 to 100 parts by weight of a fluidity modifier (g) to 100 parts by weight of the adhesive resin composition (A) described in claim 1.

12. An adhesive resin composition (F) obtained by blending 20 to 300 parts by weight of a tackifier (f) to 100 parts by weight of the adhesive resin composition (D) described in claim 5.

13. An adhesive resin composition (F) obtained by blending 20 to 300 parts by weight of a tackifier (f) to 100 parts by weight of the adhesive resin composition (E) described in claim 6.

14. An adhesive resin composition (G) obtained by blending 20 to 300 parts by weight of a tackifier (f) and 5 to 100 parts by weight of a fluidity modifier (g) to 100 parts by weight of the adhesive resin composition (D) described in claim 5.

15. An adhesive resin composition (G) obtained by blending 20 to 300 parts by weight of a tackifier (f) and 5 to 100 parts by weight of a fluidity modifier (g) to 100 parts by weight of the adhesive resin composition (E) described in claim 6.

16. A hot melt adhesive comprising the adhesive resin composition (F) obtained by blending 20 to 300 parts by weight of a tackifier (f) to 100 parts by weight of the adhesive resin composition (D) described in claim 5, or the adhesive resin composition (G) obtained by blending 20 to 300 parts by weight of a tackifier (f) and 5 to 100 parts by weight of a fluidity modifier (g) to 100 parts by weight of the adhesive resin composition (D) described in claim 5.

17. A hot melt adhesive comprising the adhesive resin composition (F) obtained by blending 20 to 300 parts by weight of a tackifier (f) to 100 parts by weight of the adhesive resin composition (E) described in claim 6, or the adhesive resin composition (G) obtained by blending 20 to 300 parts by weight of a tackifier (f) and 5 to 100 parts by weight of a fluidity modifier (g) to 100 puts by weight of the adhesive resin composition (E) described in claim 6.

18. A pressure sensitive adhesive comprising the adhesive resin composition (F) obtained by blending 20 to 300 parts by weight of a tackifier (f) to 100 parts by weight of the adhesive resin composition (D) described in claim 5, or the adhesive resin composition (G) obtained by blending 20 to 300 parts by weight of a tackifier (f) and 5 to 100 parts by weight of a fluidity modifier (g) to 100 parts by weight of the adhesive resin composition (D) described in claim 5.

19. A pressure sensitive adhesive comprising the adhesive resin composition (F) obtained by blending 20 to 300 parts by weight of a tackifier (f) to 100 parts by weight of the adhesive resin composition (E) described in claim 6, or the adhesive resin composition (G) obtained by blending 20 to 300 parts by weight of a tackifier (f) and 5 to 100 parts by weight of a fluidity modifier (g) to 100 parts by weight of the adhesive resin composition (E) described in claim 6.

* * * * *